United States Patent
Watanabe (10) Patent No.: US 11,665,114 B2
(45) Date of Patent: May 30, 2023

(54) INFORMATION PROCESSING APPARATUS AND NON-TRANSITORY COMPUTER READABLE MEDIUM FOR DETERMINATION OF MESSAGE AND MEMBER SUITABILITY FOR TASKS

(71) Applicant: FUJIFILM BUSINESS INNOVATION CORP., Tokyo (JP)

(72) Inventor: Kenichiro Watanabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 626 days.

(21) Appl. No.: 16/601,708

(22) Filed: Oct. 15, 2019

(65) Prior Publication Data

US 2020/0322289 A1    Oct. 8, 2020

(30) Foreign Application Priority Data

Apr. 8, 2019    (JP) .............................. JP2019-073667

(51) Int. Cl.
| | |
|---|---|
| *H04L 51/02* | (2022.01) |
| *G06Q 10/0631* | (2023.01) |
| *G06Q 10/10* | (2023.01) |
| *G06Q 10/107* | (2023.01) |
| *G06Q 50/00* | (2012.01) |

(52) U.S. Cl.
CPC ...... *H04L 51/02* (2013.01); *G06Q 10/063112* (2013.01); *G06Q 10/103* (2013.01); *G06Q 10/107* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 6,675,197 B1 * | 1/2004 | Satoh | G06Q 10/107 709/204 |
| 8,364,764 B2 * | 1/2013 | Hartselle | H04L 51/18 709/205 |
| 8,769,022 B2 * | 7/2014 | Tivyan | H04L 51/23 709/202 |
| 9,087,324 B2 * | 7/2015 | Osipkov | H04L 67/306 |
| 10,880,322 B1 * | 12/2020 | Jakobsson | H04L 51/08 |

(Continued)

FOREIGN PATENT DOCUMENTS

| | | |
|---|---|---|
| JP | 2000-250864 A | 9/2000 |
| JP | 2006-268304 A | 10/2006 |

(Continued)

OTHER PUBLICATIONS

Dec. 13, 2022 Office Action issued in Japanese Patent Application No. 2019-073667.

*Primary Examiner* — Backhean Tiv
(74) *Attorney, Agent, or Firm* — Oliff PLC (57) ABSTRACT

An information processing apparatus includes an acquirer and a controller. The acquirer acquires a message sent by a user for a task from a communication system. The communication system provides a communication service used by multiple users to send and receive messages via a network. The user is one of the multiple users using the communication service. The controller performs control to inform the user that the message is unsuitable if the message acquired by the acquirer is unsuitable for the task.

20 Claims, 7 Drawing Sheets

(56) References Cited

U.S. PATENT DOCUMENTS

| | | | | |
|---|---|---|---|---|
| 2006/0069599 | A1* | 3/2006 | Hatoun | G06Q 10/06 |
| | | | | 705/7.27 |
| 2007/0100947 | A1* | 5/2007 | Chen | G06Q 10/107 |
| | | | | 709/206 |
| 2007/0198314 | A1* | 8/2007 | Andrew | G06Q 10/10 |
| | | | | 705/7.19 |
| 2008/0147807 | A1* | 6/2008 | Borkenhagen | G06Q 10/107 |
| | | | | 709/206 |
| 2010/0293021 | A1* | 11/2010 | Van Styn | G06Q 10/06 |
| | | | | 707/E17.014 |
| 2011/0213845 | A1* | 9/2011 | Logan | H04L 51/18 |
| | | | | 709/206 |
| 2014/0137003 | A1* | 5/2014 | Peters | G06Q 10/107 |
| | | | | 715/758 |
| 2015/0347534 | A1* | 12/2015 | Gross | H04L 51/046 |
| | | | | 707/722 |
| 2016/0292206 | A1* | 10/2016 | Ruiz Velazquez | G06F 16/258 |
| 2016/0307143 | A1* | 10/2016 | Mongeon | G06F 3/017 |
| 2017/0024426 | A1* | 1/2017 | Kazama | G06F 40/197 |
| 2020/0050620 | A1* | 2/2020 | Clark | G06N 20/00 |
| 2020/0322289 | A1* | 10/2020 | Watanabe | G06Q 10/063112 |
| 2021/0110327 | A1* | 4/2021 | Bellet | G06Q 10/1095 |
| 2022/0014543 | A1* | 1/2022 | Jakobsson | H04L 63/1425 |

FOREIGN PATENT DOCUMENTS

| | | |
|---|---|---|
| JP | 2009-223392 A | 10/2009 |
| JP | 2014-154067 A | 8/2014 |
| JP | 2015-087958 A | 5/2015 |

* cited by examiner

| TASK NO. | MEMBER ID |
|---|---|
| 1 | UserA, UserB, UserC, UserD |
| 2 | UserA, UserD, UserE, UserF |
| 3 | UserF, UserG, UserH, UserM |
| ⋮ | ⋮ |

| MESSAGE NO. | MESSAGE CONTENT | NUMBER OF REPLIES | POSTED TIME | POSTED MEMBER ID | READ MEMBER ID | EVALUATION INFORMATION GOOD | EVALUATION INFORMATION BAD |
|---|---|---|---|---|---|---|---|
| 1 | xxxxx |  | MARCH 1, 2019 10:00 | UserA | UserC, UserD, UserF, UserG, UserH | 3 | 0 |
| 2 | xxxxx | 1 | MARCH 1, 2019 12:30 | UserC | UserC, UserD, UserF, UserG | 4 | 1 |
| 3 | xxxxx | 2 | MARCH 1, 2019 15:10 | UserF | UserC, UserD, UserF | 2 | 1 |
| .. | .. | .. | .. | .. | .. | .. | .. |

| USER ID | AFFILIATION | SKILL SET | PROFESSIONAL BACKGROUND |
|---------|-------------|-----------|-------------------------|
| UserA | DEVELOPMENT | TECHNICAL SKILLS A, B | R&D |
| UserB | GENERAL AFFAIRS | SUPPORT SKILLS A, C | PERSONNEL, GENERAL AFFAIRS |
| UserC | SALES | SALES SKILLS B, D, G | SALES |
| ⋮ | ⋮ | ⋮ | ⋮ |

INFORMATION PROCESSING APPARATUS AND NON-TRANSITORY COMPUTER READABLE MEDIUM FOR DETERMINATION OF MESSAGE AND MEMBER SUITABILITY FOR TASKS

CROSS-REFERENCE TO RELATED APPLICATIONS

This application is based on and claims priority under 35 USC 119 from Japanese Patent Application No. 2019-073667 filed Apr. 8, 2019.

BACKGROUND

(i) Technical Field

The present disclosure relates to an information processing apparatus and a non-transitory computer readable medium.

(ii) Related Art

Japanese Unexamined Patent Application Publication No. 2000-250864 discloses a collaborative work assisting system for assisting multiple users in communicating with each other to do collaborative work on a network by using computer terminals. The collaborative work assisting system includes a work area detector, a user viewpoint calculator, and a dynamic communication group generator. The work area detector detects a work area where a user is doing collaborative work. The user viewpoint calculator extracts a keyword from the work area detected by the work area detector and calculates viewpoint information for this user. The user viewpoint calculator calculates viewpoint information for each user. The dynamic communication group generator dynamically generates a communication group by finding a user having a viewpoint similar to the viewpoint indicated by the viewpoint information concerning a certain user calculated by the user viewpoint calculator and by grouping such users together.

SUMMARY

While multiple users are using a communication service to send and receive messages via a network, a message sent by a user for a certain task by using this service may not always be suitable. For example, a message sent for a certain task may be unnecessary for some users.

Aspects of non-limiting embodiments of the present disclosure relate to an information processing apparatus and a non-transitory computer readable medium which can reduce the number of unsuitable messages left in a task of a communication service used by multiple users to send and receive messages via a network.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an acquirer and a controller. The acquirer acquires a message sent by a user for a task from a communication system. The communication system provides a communication service used by multiple users to send and receive messages via a network. The user is one of the multiple users using the communication service. The controller performs control to inform the user that the message is unsuitable if the message acquired by the acquirer is unsuitable for the task.

BRIEF DESCRIPTION OF THE DRAWINGS

An exemplary embodiment of the present disclosure will be described in detail based on the following figures, wherein.

DETAILED DESCRIPTION

An exemplary embodiment of the disclosure will now be described below in detail with reference to the accompanying drawings.

Figure 1:
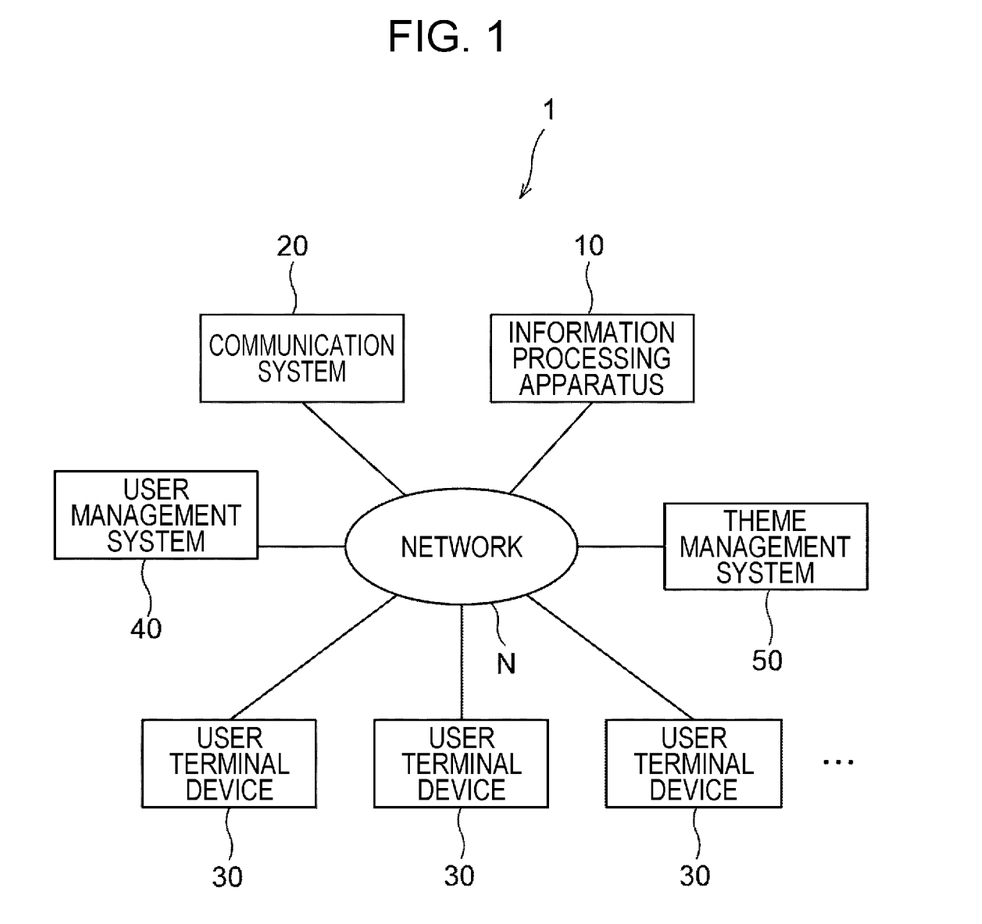
FIG. 1 is a schematic diagram illustrating an example of an information processing system.

FIG. 1 is a schematic diagram illustrating an example of an information processing system 1 according to the exemplary embodiment. The information processing system 1 includes an information processing apparatus 10, a communication system 20, plural user terminal devices 30, a user management system 40, and a theme management system 50 which are connected to one another via a network N.

The information processing apparatus 10 acquires a message sent by a user for a certain task from the communication system 20. If the acquired message is not suitable for the task, the information processing apparatus 10 informs the user that the message is not suitable. The communication system 20 provides a communication service used by multiple users to send and receive messages via the network N.

A task is a framework for restricting at least one of a communication theme and a task member. In a broader sense, a task includes email and threads in bulletin board systems.

A message is a type of digital remark posted on a communication service by a user.

As described above, the communication system 20 provides a communication service used by multiple users to send and receive messages via the network N.

A user operates its user terminal device 30 to post a message for a task generated in a communication service provided by the communication system 20. The posted message is displayed on the user terminal device 30 of another user using the communication service. Another user reads the posted message and posts a reply message if necessary. In this manner, multiple users communicate with each other by sending and receiving messages by using the communication service provided by the communication system 20.

The user management system 40 manages user information including information concerning the attributes of members of a task. As the attributes, at least one of the affiliation, skill set representing a variety of specific skills, and professional background of a member is used. However, the attributes are not limited to these elements.

The theme management system 50 is a system which manages information by theme. Examples of the theme management system 50 are a subject management system which manages information by subject, a document management system which manages information by document, and a process management system which manages information by process. However, the theme management system 50 is not limited to these types of management systems. Users may post messages concerning a theme managed by the theme management system 50.

Figure 2:
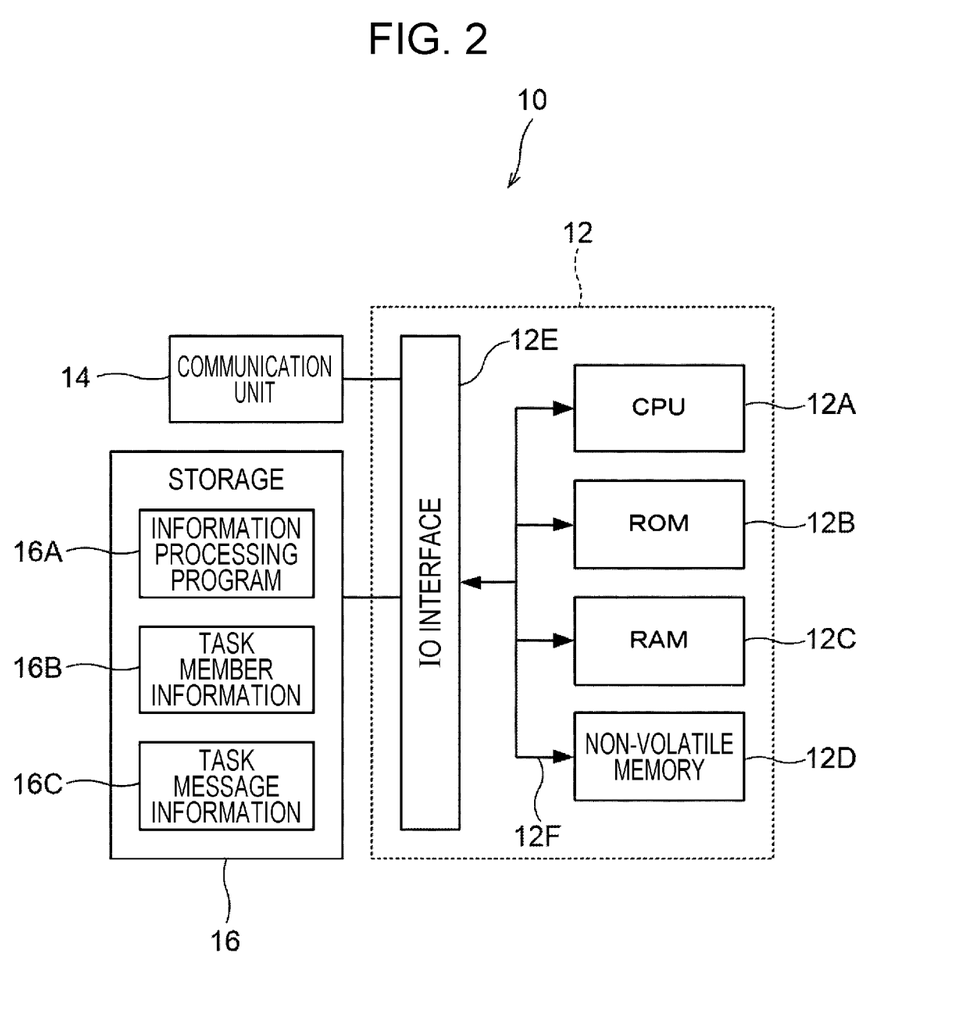
FIG. 2 is a block diagram illustrating an example of the electrical configuration of an information processing apparatus.

FIG. 2 is a block diagram illustrating an example of the information processing apparatus 10. The information processing apparatus 10 is constituted by a general-purpose computer.

As shown in FIG. 2, the information processing apparatus 10 includes a controller 12. The controller 12 includes a central processing unit (CPU) 12A, a read only memory (ROM) 12B, a random access memory (RAM) 12C, a non-volatile memory 12D, and an input/output (IC)) interface 12E. The CPU 12A, the ROM 12B, the RAM 12C, the non-volatile memory 12D, and the IO interface 12E are connected to one another via a bus 12F.

A communication unit 14 and a storage 16 are connected to the IO interface 12E.

The communication unit 14 is an interface for performing data communication with an external device.

The storage 16 is a non-volatile storage device, such as a hard disk, and stores an information processing program 16A, task member information 16B, and task message information 16C, which will be discussed later. The CPU 12A reads the information processing program 16A from the storage 16 and executes it.

Figure 3:
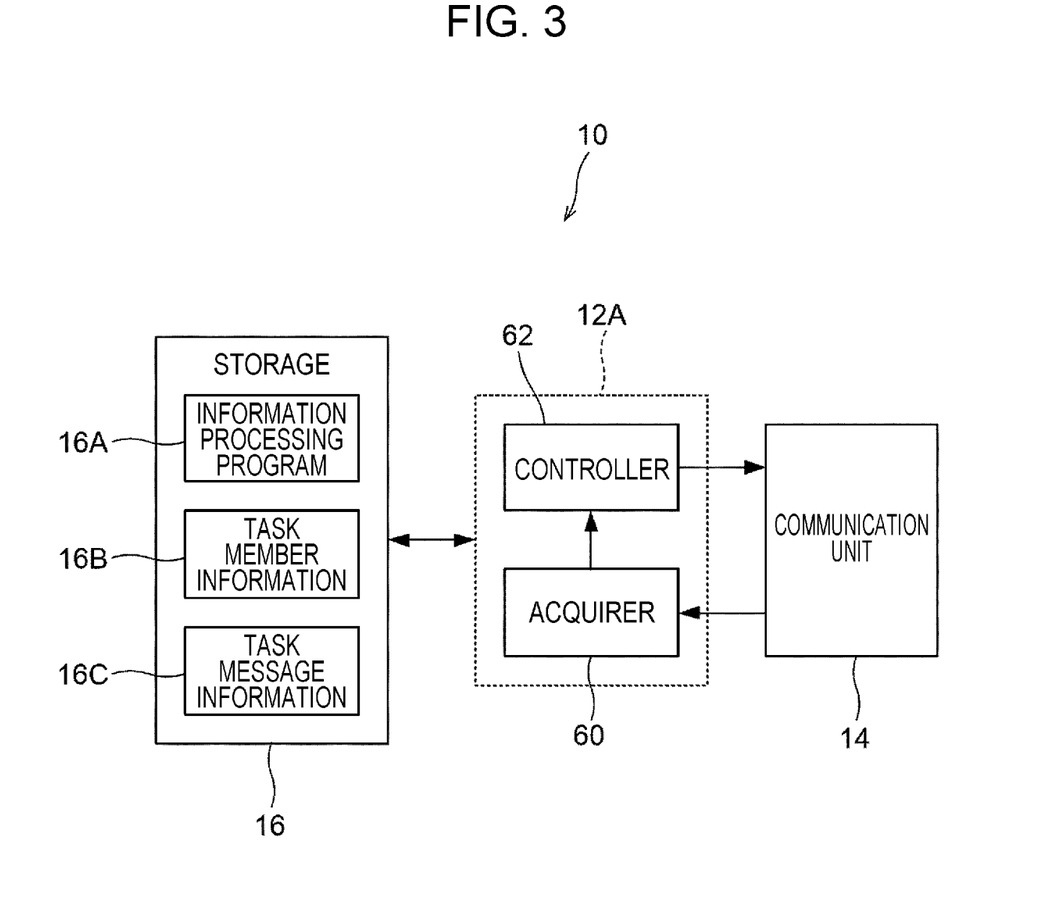
FIG. 3 is a block diagram illustrating an example of the functional configuration of the information processing apparatus.

The functional configuration of the CPU 12A implemented when the information processing apparatus 10 executes the information processing program 16A will be described below.

As shown in FIG. 3, the CPU 12A includes an acquirer 60 and a controller 62 as functional modules.

The acquirer 60 acquires a message sent by a user for a task from the communication system 20.

The controller 62 performs control to inform the user that the message is unsuitable if the message acquired by the acquirer 60 is unsuitable for the task.

Figure 4:
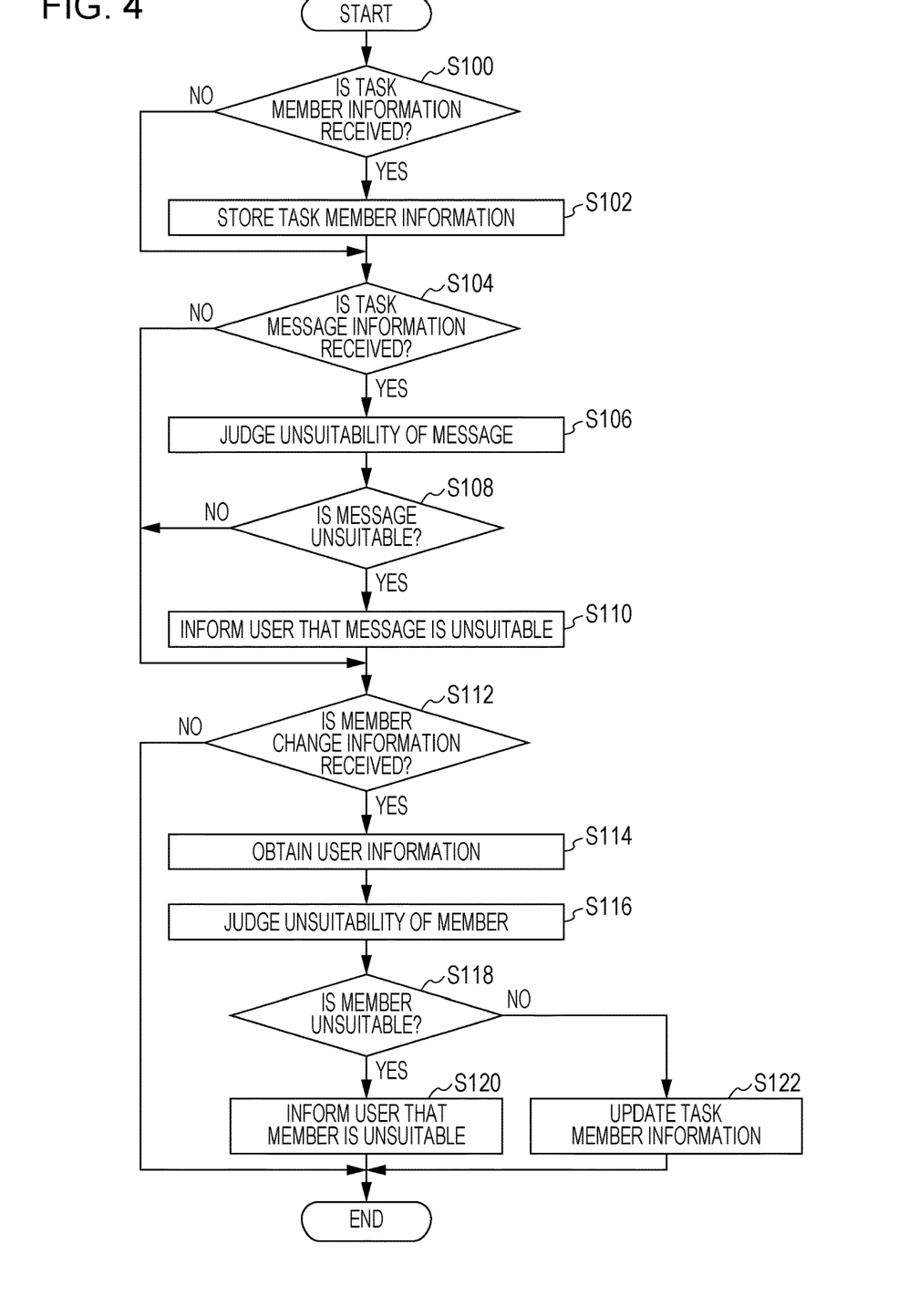
FIG. 4 is a flowchart illustrating an example of the procedure of an information processing program.

The operation executed by the information processing apparatus 10 according to the exemplary embodiment will be discussed below. As shown in FIG. 2, the information processing program 16A is stored in the storage 16. As a result of the CPU 12A reading the information processing program 16A and executing it, information processing shown in FIG. 4 is executed. Information processing shown in FIG. 4 is repeatedly executed at predetermined intervals.

Figure 5:
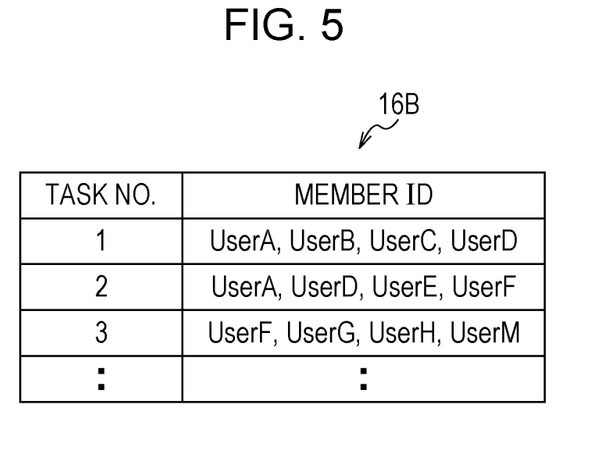
FIG. 5 is a table illustrating an example of task member information.

When an event concerning a task member has occurred, the communication system 20 updates the task member information 16B, such as that shown in FIG. 5, in accordance with the content of the event and sends the updated task member information 16B to the information processing apparatus 10. The task member information 16B includes items of information concerning a task number (No.) uniquely assigned to a task and a member ID of a task member. In this exemplary embodiment, as the member ID, a user ID defined by user information, which will be discussed later, is used.

An event concerning a task member occurs on the occasions when a new task is added or an existing task is deleted, for example. When a new task is added, the communication system 20 adds the task No. of the new task and the member IDs of members of this task to the task member information 16B and sends it to the information processing apparatus 10. When a task is deleted from the task member information 16B, the communication system 20 deletes the task No. of the deleted task and the member IDs of members of this task from the task member information 16B and sends it to the information processing apparatus 10.

When there is any change in task members of a task, the communication system 20 sends the member ID of a task member to be changed and the task No. of the task including this task member to the information processing apparatus 10 as member change information. Changing of members may be adding of a member and a deleting of a member. In this exemplary embodiment, adding of a member will be discussed as changing of members. When a new member is added to a certain task, the communication system 20 sends the task No. of this task and a member ID of the new member to the information processing apparatus 10 as member change information.

Figure 6:
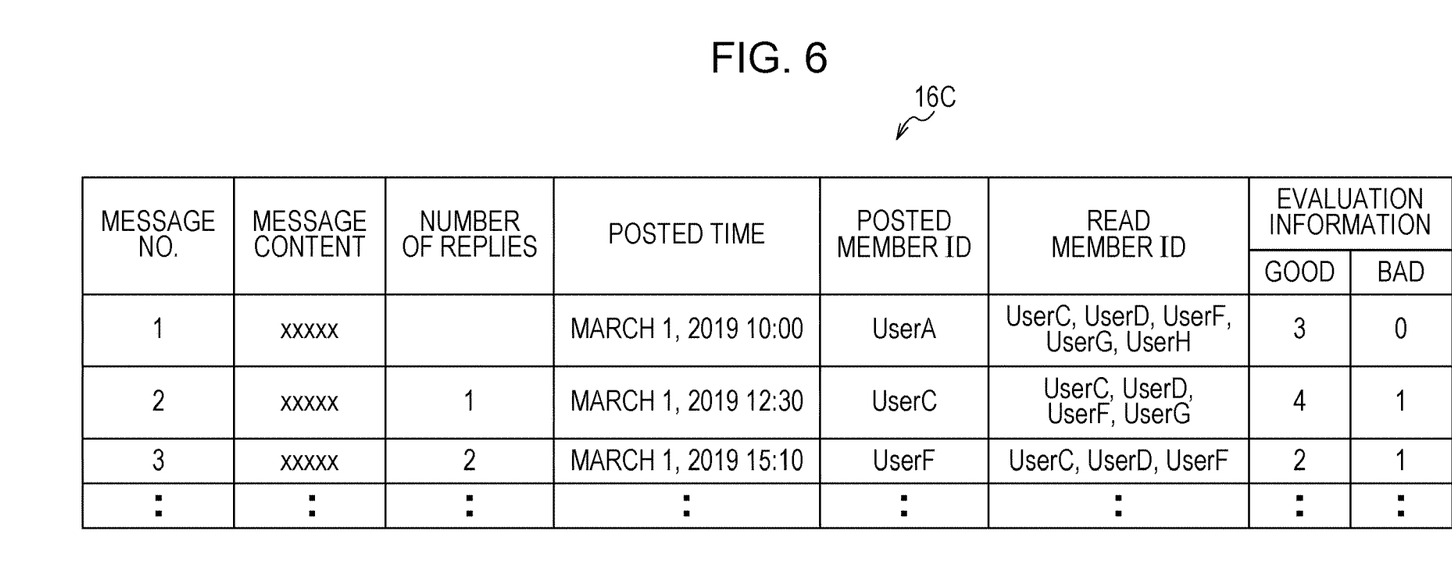
FIG. 6 is a table illustrating an example of task message information.

When an event concerning a task message has occurred, the communication system 20 updates the task message information 16C, such as that shown in FIG. 6, in accordance with the content of the event and sends the task message information 16C to the information processing apparatus 10.

An event concerning a task message occurs on the occasions when a message is posted for a task from a user terminal device 30, a member has read a posted message, or evaluation information is appended to a posted message, for example.

As shown in FIG. 6, the task message information 16C includes items of information concerning a message No. uniquely assigned to a message, the content of the message, the date and time on and at which the message is posted, the member ID of a member having posted the message, the member ID of a member having read the message, and evaluation information concerning the message. In the example in FIG. 6, as the evaluation information, the number of members having found a message good and that of members found the message bad are indicated.

In step S100, it is judged whether the task member information 16B is received from the communication system 20. If the task member information 16B is received, the process proceeds to step S102. If the task member information 16B is not received, the process proceeds to step S104.

In step S102, the received task member information 16B is stored in the storage 16.

In step S104, it is judged whether the task message information 16C is received from the communication system 20. If the task message information 16C is received, the process proceeds to step S106. If the task message information 16C is not received, the process proceeds to step S112.

In step S106, if the task message information 16C received in step S104 indicates that a new message is added, the new message is extracted from the task message information 16C and the unsuitability of the message is judged. For example, it is judged from the reactions of other users to this message whether the message is unsuitable.

More specifically, it is judged whether at least one of a read rate and a reply rate concerning the message satisfies an unsuitability condition. The read rate is a measure of how many recipients of the message have read the message. The reply rate is a measure of how many recipients of the message have replied. The unsuitability condition is a condition representing that a message is an unsuitable message. If the unsuitability condition is satisfied, at least one of the read rate and the reply rate is low, so it is more likely that the message is unsuitable for the task. The message is thus determined to be unsuitable for the task. In contrast, if the unsuitability condition is not satisfied, at least one of the read rate and the reply rate is not low, so it is less likely that the message is unsuitable for the task. The message is thus determined to be suitable for the task.

The read rate is typically calculated as a result of obtaining the total number of other members of the task from the task member information 16B and obtaining the number of other members having read the message by referring to the read member IDs indicated in the task message information 16C.

The reply rate is typically calculated as a result of obtaining the total number of other members of the task from the task member information 16B and obtaining the number of other members having replied to the message by referring to the number of replies indicated in the task message information 16C.

The unsuitability condition is a condition that at least one of the read rate and the reply rate is smaller than or equal to a predetermined threshold. The threshold is set to be a value that makes it possible to determine that the acquired message is highly likely to be unsuitable for the task if at least one of the read rate and the reply rate is smaller than or equal to this threshold.

Even if at least one of the read rate and the reply rate is smaller than or equal to the threshold, it may be determined that the acquired message is not unsuitable if the time elapsed after this message has been sent for the task is shorter than or equal to a predetermined time. The reason for this is that if the time elapsed after the message has been sent for the task is short, it is highly likely that other members have not yet read the message. The predetermined time is set to be a time that makes it possible to determine that it is highly likely that other members have not yet read the message if the time elapsed after this message has been sent is shorter than or equal to this predetermined time. The time elapsed after the message has been sent for the task is obtained as a result of calculating the period of time from the posted time of the message indicated in the task message information 16C until the current time.

Even if at least one of the read rate and the reply rate is smaller than or equal to the threshold, it may be determined that the acquired message is not unsuitable if the message indicates that a reply message is not required. Whether the message requires a reply message or not may be determined according to whether the message contains a character string suggesting that a reply message is not required, such as "no reply needed (NRN)" and "for your information".

At least one of the read rate and the reply rate may be calculated by excluding members who have not had enough time to check the message. Whether members have had enough time to check the message or not may be determined based on schedule information concerning the members, for example.

At least one of the read rate and the reply rate may be calculated by excluding members who are less likely to check the message. Whether members are less likely to check the message or not may be determined based on personnel assessment information concerning the members, for example. A member having a low personnel assessment is determined to be a member being less likely to check the message.

Even if at least one of the read rate and the reply rate is smaller than or equal to the threshold, it may be determined that the acquired message is not unsuitable if the message is stored in a save folder to check the message later.

If the message is addressed to a specific member, at least one of the read rate and the reply rate may be calculated by excluding members other than the specific member.

It may be judged whether the message is unsuitable by using evaluation information concerning the evaluations of the message. For example, if the evaluation of the message indicated by the evaluation information satisfies an evaluation condition, the message is determined to be unsuitable. The evaluation condition is a condition representing that a message is an unsuitable message. More specifically, the evaluation condition may be a condition that the rate of the number of members having found the message bad indicated in the task message information 16C to that of the total number of other members of the task is greater than or equal to a predetermined rate. Alternatively, the evaluation condition may be a condition that the rate of the number of members having found the message good to that of the total number of other members of the task is smaller than or equal to a predetermined rate.

The number of items of evaluation information may be calculated for each user, and the above-described threshold for the unsuitability condition may be set in accordance with the calculated number of items of evaluation information. For example, the number of messages with a "good" evaluation may be calculated, and as the number of such messages is greater, the threshold may be set to be lower. The reason for this is that a user having more messages with a "good" evaluation is likely to have posted useful messages. Conversely, the number of messages with a "bad" evaluation may be calculated, and as the number of such messages is greater, the threshold may be set to be higher. The reason for this is that a user having more messages with a "bad" evaluation is unlikely to have posted useful messages.

In step S108, it is judged whether the message has been determined to be an unsuitable message in step S106. If the message is found to be unsuitable, the process proceeds to step S110. If the message is not found to be unsuitable, the process proceeds to step S112.

In step S110, the user is informed that the message is unsuitable. More specifically, information indicating that the message is unsuitable is sent to the user terminal device 30 of the user. The user terminal device 30 displays this information on a display so that user can recognize that the posted message is unsuitable.

This information may be sent to the user terminal device 30 via the communication system 20. In this case, the communication system 20 may cause the user terminal device 30 to display, not only this information, but also a warning screen for allowing the user to cancel the posted message, on the display of the user terminal device 30. In this case, information indicating a recommendation to transfer the message to another task may be displayed on the warning screen. The reason why such a recommendation is provided may also be displayed on the warning screen. For example, information indicating that the read rate and the reply rate are low may be displayed on the warning screen. In this case, if the user has instructed to transfer the message to another task, an existing task suitable for the message may be extracted and the message may be transferred to the extracted task.

If the posted message is a reply message, the reply message and other related messages may be transferred to an existing task as a group of messages in a thread. In this case, a screen showing a recommendation to transfer the thread to another task may be displayed on the user terminal device 30 of the member having created the thread. The thread may be transferred to a newly created task instead of an existing task.

In step S112, it is judged whether member change information is received from the communication system 20. If member change information is received, the process proceeds to step S114. If member change information is not received, this routine is terminated.

In step S114, as a result of requesting, based on the received member change information, the user management system 40 to send the member IDs of all members of a task to which a new member is added, user information concerning all the members of the task is obtained. The user management system 40 manages user information, such as user information 70 shown in FIG. 7. The user information 70 is information representing user attributes. In the exemplary embodiment, examples of the attributes are user ID, affiliation, skill set, and professional background.

Figure 7:
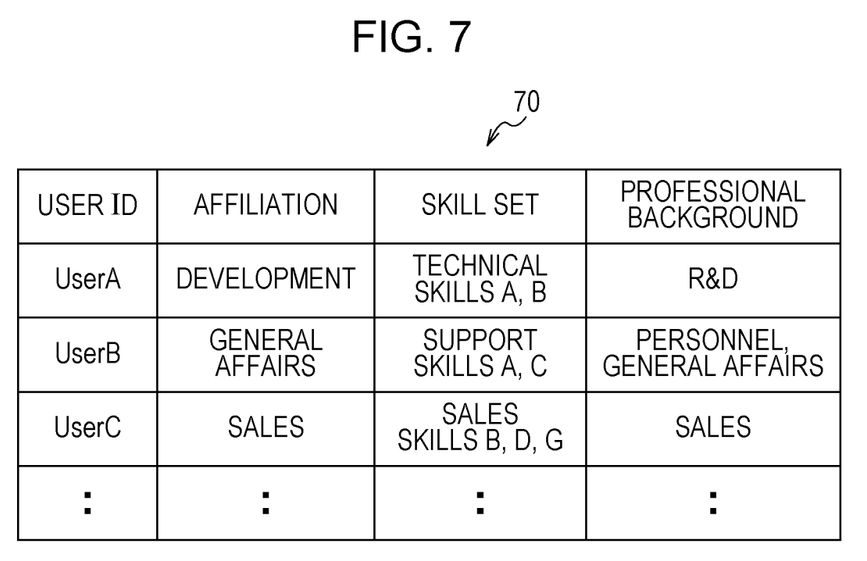
FIG. 7 is a table illustrating an example of user information.

In step S116, the unsuitability of the new member for the task is judged based on the user information obtained in step S114. For example, if the attributes of the new member are different from those of the existing members, the new member is determined to be unsuitable for the task. For example, if the skill set of the new member is different from the skill sets of the other members, the new member is determined to be unsuitable for the task. More specifically, the rate of the number of existing members that have a certain type of skill set to the total number of existing members for the task is calculated based on the user information 70. The rate is calculated for each type of skill set. A predetermined threshold is set for the calculated rate of each type of skill set. If the new member does not have skill sets associated with the corresponding thresholds or higher, the new member is determined to be unsuitable for the task. This is because the type of skill set of the new member is considerably different from the types of skill sets of the existing members, and it can thus be determined that the new member is not likely to be suitable for the task of the existing members.

If the professional background of the new member is different from the professional backgrounds of the existing members, the new member may be determined to be unsuitable for the task. As in the case of the skill set, the rate of the number of existing members that have a certain professional background to the total number of existing members for the task is calculated. The rate is calculated for each professional background. A predetermined threshold is set for the calculated rate of each professional background. If the new member does not have professional backgrounds associated with the corresponding thresholds or higher, the new member is determined to be unsuitable for the task. This is because the type of professional background of the new member is considerably different from the types of professional backgrounds of the existing members, and it can thus be determined that the new member is not likely to be suitable for the task of the existing members.

Additionally, if the affiliation of the new member is different from the affiliations of the existing members, the new member may be determined to be unsuitable for the task.

In step S118, it is judged whether the new member has been determined to be an unsuitable member in step S116. If the new member is found to be unsuitable, the process proceeds to step S120. If the new member is not found to be unsuitable, the process proceeds to step S122.

In step S120, the user is informed that the new member is unsuitable. More specifically, information indicating that the new member is unsuitable for the task and it is recommended that the new member be transferred to a different task is sent to the user terminal device 30 of the user. Information that the new member is unsuitable for the task may be sent to the user terminal device 30 via the communication system 20. The user terminal device 30 then displays this information on a display so that user can identify itself as an unsuitable member.

In step S122, the task member information 16B is updated based on the member change information. That is, the member indicated by the member change information is added to the members of the corresponding task in the task member information 16B.

As described above, in this exemplary embodiment, if at least one of the read rate and the reply rate satisfies an unsuitability condition representing that the message is unsuitable, a user having sent this message is informed that the message is unsuitable.

Information obtained from the theme management system 50 may be used to determine whether a message is unsuitable. The theme management system 50 is an example of another information system different from the communication system 20. This will be described below through illustration of an example in which the theme management system 50 is a subject management system.

The subject management system manages information by subject. More specifically, the subject management system manages information concerning each subject by event having occurred in relation to a subject. It is assumed in this exemplary embodiment that subjects are "inquiry support" and "error handling" concerning products and that plural items of information concerning plural events of each subject are separately managed. In this case, a user posts a message for a task generated for a specific subject. When posting a message, a user appends identification information, such as a character string, for identifying which event of which subject the message concerns to the message.

If the message posted by a user is not related to the subject of the task, it is determined in step S106 in FIG. 4 that the message is unsuitable for the task. For example, if the identification information appended to the message indicates an event of the subject "error handling", while the subject of the task is "inquiry support", it is determined that the message is unsuitable for the task. Then, in step S110, information indicating that the message is unsuitable for the task and that it is recommended that the message be transferred to a different task is sent to the user terminal device 30 of the user. This enables the user to recognize that the message has been sent for a wrong task.

Instead of using information obtained from the subject management system, information from another type of theme management system may be used to determine whether a message is unsuitable.

For example, information obtained from a process management system may be used to determine whether a message is unsuitable. The process management system manages information by process. An example of processes is a development process. It is assumed in this exemplary embodiment that the process management system manages information concerning request checking, subject defining, designing, implementing, and testing as processes. If a posted message is not related to the process of a task, it is determined to be unsuitable for the task. For example, if identification information appended to the message indicates an event of the process "implementing", while the process of the task is "subject defining", it is determined that the message is unsuitable for the task.

Information obtained from a document management system may be used to determine whether a message is unsuitable. As in the process management system which manages information by process, the document management system stores products (documents) in storage locations (folders and drawers) by phase. As in the process management system, in the document management system, storage locations, such as folders, are created for individual processes, that is, request checking, subject defining, designing, implementing, and testing. If a posted message is not related to the process of a task, it is determined to be unsuitable for the task. For example, if identification information appended to the message indicates an event of the process "testing", while the process of the task is "designing", it is determined that the message is unsuitable for the task.

The present disclosure has been discussed through illustration of the exemplary embodiment. However, the disclosure is not restricted to the technical range of the above-described exemplary embodiment. Various modifications and/or improvements may be made to the exemplary embodiment without departing from the spirit and scope of the disclosure. Exemplary embodiments obtained by making modifications and/or improvements are also encompassed within the technical range of the disclosure.

For example, in the exemplary embodiment, when a message is sent, the information processing apparatus 10 automatically judges whether the message is unsuitable. Alternatively, a member of a certain task may be able to specify that a posted message is unsuitable for the task.

In the above-described exemplary embodiment, the information processing program 16A is installed in the storage 16 in advance. However, the information processing program may be provided in a different manner, for example, it may be provided as a result of being recorded in a storage medium, such as a compact disc (CD)-ROM, or via a network.

In the above-described exemplary embodiment, information processing is implemented as a result of executing a software program by using a computer. However, information processing may be implemented in a different manner, for example, it may be implemented by using hardware or a combination of hardware and software.

The configuration of the information processing apparatus 10 (see FIG. 2) discussed in the exemplary embodiment is only an example. Unnecessary elements may be deleted or new elements may be added without departing from the spirit and scope of the disclosure.

The procedure of the information processing program (see FIG. 4) discussed in the exemplary embodiment is only an example. Unnecessary steps may be deleted, new steps may be added, or the order of steps may be changed without departing from the spirit and scope of the disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A system comprising:
a communication system providing a communication service used by a plurality of users to send and receive messages via a network;
a user terminal device; and
an information processing apparatus including a processor programmed to
acquire a message sent by the user terminal device for a task from the communication system, the user terminal device being with one of the plurality of users using the communication service, and
transmit, to the user terminal device, information for displaying a warning screen to inform the user that the message is unsuitable if the message acquired is unsuitable for the task, wherein:
the warning screen further displays an option for the user to cancel posting of the message for the task, and
the communication system deletes the message when the user cancels posting of the message for the task.

2. The information processing apparatus according to claim 1, wherein the processor determines that the message is unsuitable from a reaction of another user to the message.

3. The information processing apparatus according to claim 2, wherein the processor determines that the message is unsuitable if at least one of a read rate and a reply rate satisfies an unsuitability condition.

4. The information processing apparatus according to claim 1, wherein, if a time elapsed after the message has been sent for the task is shorter than or equal to a predetermined time, the processor determines that the message is not unsuitable.

5. The information processing apparatus according to claim 2, wherein, if a time elapsed after the message has been sent for the task is shorter than or equal to a predetermined time, the processor determines that the message is not unsuitable.

6. The information processing apparatus according to claim 3, wherein, if a time elapsed after the message has been sent for the task is shorter than or equal to a predetermined time, the processor determines that the message is not unsuitable.

7. The information processing apparatus according to claim 1, wherein, if the message indicates that a reply is not required, the processor determines that the message is not unsuitable.

8. The information processing apparatus according to claim 2, wherein, if the message indicates that a reply is not required, the processor determines that the message is not unsuitable.

9. The information processing apparatus according to claim 3, wherein, if the message indicates that a reply is not required, the processor determines that the message is not unsuitable.

10. The information processing apparatus according to claim 1, wherein the processor determines whether the message is unsuitable by using information obtained from an information system different from the communication system.

11. The information processing apparatus according to claim 10, wherein:
the information system is a theme management system that manages information by theme, and the task is associated with a theme managed by the theme management system; and
if the message is related to a theme different from the theme associated with the task, the processor determines that the message is unsuitable.

12. The information processing apparatus according to claim 1, wherein, upon receiving a request to make a change in members of the task, if an attribute of a member to be changed is different from an attribute of an existing member of the task, the processor performs control to inform the member to be changed that the member is unsuitable.

13. The information processing apparatus according to claim 2, wherein, upon receiving a request to make a change in members of the task, if an attribute of a member to be changed is different from an attribute of an existing member of the task, the processor performs control to inform the member to be changed that the member is unsuitable.

14. The information processing apparatus according to claim 4, wherein, upon receiving a request to make a change in members of the task, if an attribute of a member to be changed is different from an attribute of an existing member of the task, the processor performs control to inform the member to be changed that the member is unsuitable.

15. The information processing apparatus according to claim 12, wherein the attribute includes at least one of an affiliation, a skill set representing a variety of specific skills, and a professional background concerning the member.

16. The information processing apparatus according to claim 1, wherein the processor determines whether the message is unsuitable by using evaluation information concerning an evaluation of the message.

17. The information processing apparatus according to claim 2, wherein the processor determines whether the message is unsuitable by using evaluation information concerning an evaluation of the message.

18. The information processing apparatus according to claim 4, wherein the processor determines whether the message is unsuitable by using evaluation information concerning an evaluation of the message.

19. The information processing apparatus according to claim 16, wherein, if the evaluation of the message indicated by the evaluation information satisfies an evaluation condition representing that the message is unsuitable, the processor determines that the message is unsuitable.

20. A non-transitory computer readable medium storing a program causing a processor to execute a process, the process comprising:
acquiring a message sent by a user terminal device for a task from a communication system, the communication system providing a communication service used by a plurality of users to send and receive messages via a network, the user terminal device being with one of the plurality of users using the communication service; and
transmitting, to the user terminal device, information for displaying a warning screen to inform the user that the message is unsuitable if the message acquired is unsuitable for the task, wherein:
the warning screen further displays an option for the user to cancel posting of the message for the task, and
the communication system deletes the message when the user cancels posting of the message for the task.

* * * * *